(12) United States Patent
Balasubramaniam et al.

(10) Patent No.: US 10,991,387 B1
(45) Date of Patent: Apr. 27, 2021

(54) DATA STORAGE DEVICE MIGRATING DATA FROM NON-ENERGY ASSIST DISK SURFACE TO ENERGY ASSIST DISK SURFACE

(71) Applicant: Western Digital Technologies, Inc., San Jose, CA (US)

(72) Inventors: Prakash Balasubramaniam, Rancho Santa Margarita, CA (US); David R. Hall, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/832,352

(22) Filed: Mar. 27, 2020

(51) Int. Cl.
| | | |
|---|---|---|
| *G11B 11/105* | (2006.01) | |
| *G11B 5/48* | (2006.01) | |
| *G11B 5/39* | (2006.01) | |
| *G11B 20/18* | (2006.01) | |
| *G11B 5/00* | (2006.01) | |
| *G11B 5/60* | (2006.01) | |
| *G11B 7/126* | (2012.01) | |

(52) U.S. Cl.
CPC .............. *G11B 5/4813* (2013.01); *G11B 5/39* (2013.01); *G11B 20/1866* (2013.01); *G11B 5/6088* (2013.01); *G11B 7/126* (2013.01); *G11B 2005/0021* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 8,605,384 B1 | 12/2013 | Liu et al. | |
| 8,681,443 B2 | 3/2014 | Hall | |
| 8,699,171 B1 | 4/2014 | Boyle | |
| 8,699,175 B1 | 4/2014 | Olds et al. | |
| 9,218,849 B1 * | 12/2015 | Trantham | G11B 27/36 |
| 9,417,814 B1 | 8/2016 | Hall | |
| 9,665,293 B2 | 5/2017 | Lin et al. | |
| 9,679,597 B1 | 6/2017 | Zhu et al. | |
| 9,704,519 B1 | 7/2017 | Zhu et al. | |
| 10,026,420 B1 * | 7/2018 | Rausch | G11B 5/012 |
| 10,665,263 B1 * | 5/2020 | Xiong | G11B 21/106 |
| 10,699,736 B1 * | 6/2020 | Rajauria | G11B 5/3136 |
| 2002/0186492 A1 | 12/2002 | Smith | |
| 2019/0227898 A1 * | 7/2019 | Gaertner | G06F 3/0644 |
| 2019/0303034 A1 | 10/2019 | Gaertner | |

* cited by examiner

*Primary Examiner* — Tan X Dinh (57) ABSTRACT

A data storage device is disclosed comprising a non-energy assist (NEA) head configured to access a first disk surface, and an energy assist (EA) head configured to access a second disk surface. The data storage device further comprises control circuitry configured to write data to the first disk surface, and migrate at least part of the data to the second disk surface.

21 Claims, 5 Drawing Sheets

DATA STORAGE DEVICE MIGRATING DATA FROM NON-ENERGY ASSIST DISK SURFACE TO ENERGY ASSIST DISK SURFACE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Figure 1:
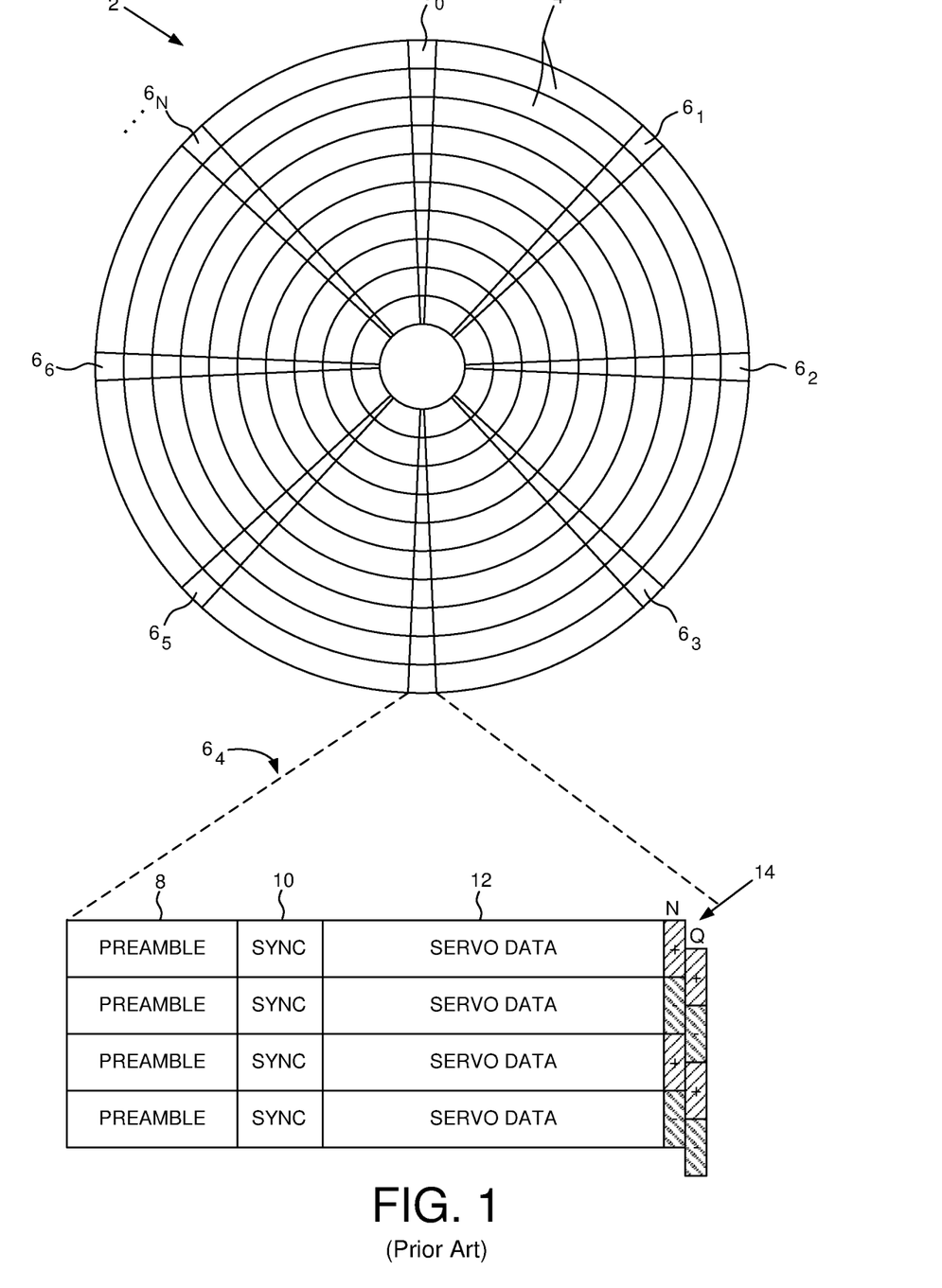
FIG. 1 shows a prior art disk format comprising a plurality of servo tracks defined by servo sectors.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2C:
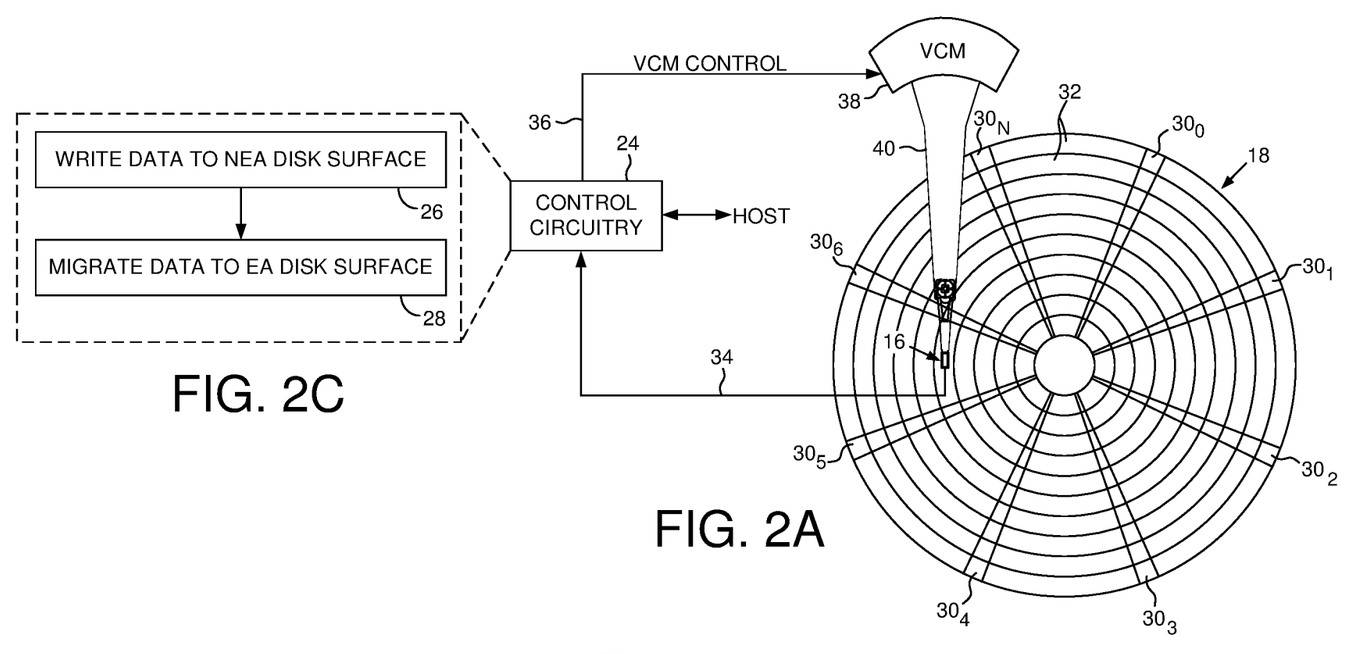
FIGS. 2A and 2B show a data storage device in the form of a disk drive according to an embodiment comprising a non-energy assist (NEA) head actuated over a first disk surface and an energy assist (EA) head actuated over a second disk surface.
FIG. 2C is a flow diagram according to an embodiment wherein data is first written to the NEA disk surface using the NEA head, and then migrated to the EA disk surface using the EA head.
Figure 2B:
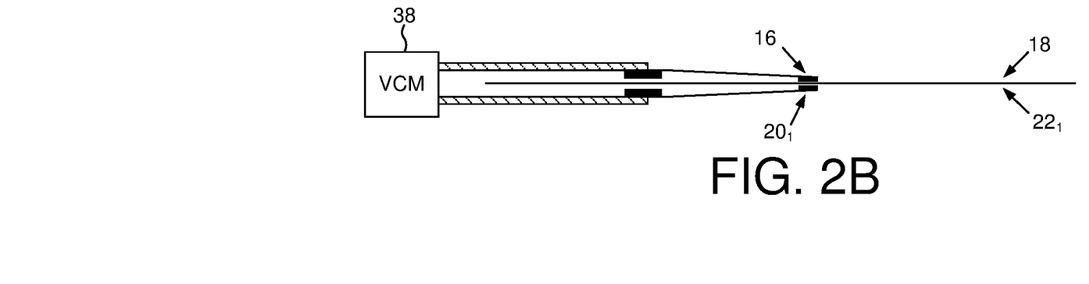

FIGS. 2A and 2B show a data storage device in the form of a disk drive according to an embodiment comprising a non-energy assist (NEA) head 16 configured to access a first disk surface 18, and a first energy assist (EA) head $20_1$ configured to access a second disk surface $22_1$. The disk drive further comprises control circuitry 24 configured to execute the flow diagram of FIG. 2C, wherein data is written to the first disk surface (block 26), and at least part of the data is then migrated to the second disk surface (block 28).

In the embodiment of FIG. 2A, each disk surface comprises a plurality of servo sectors $30_0$-$30_N$ that define a plurality of servo tracks, wherein data tracks 32 are defined relative to the servo tracks at the same or different radial density. The control circuitry 24 processes a read signal 34 emanating from the head to demodulate the servo sectors and generate a position error signal (PES) representing an error between the actual position of the head and a target position relative to a target track. A servo control system in the control circuitry 24 filters the PES using a suitable compensation filter to generate a control signal 36 applied to a VCM 38 which rotates an actuator arm 40 about a pivot in order to actuate the head radially over the disk in a direction that reduces the PES. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2B, the NEA head 16 comprises a suitable write element (e.g., an inductive coil), a suitable read element (e.g., a magnetoresistive element), and optionally a suitable fly height actuator (FHA) configured to control a fly height of the head over the disk surface. In addition to these elements, the EA head $20_1$ further comprise a suitable EA element that facilitates write operations, such as a suitable laser configured to heat the disk surface (e.g., a laser diode) to implement heat assisted magnetic recording (HAMR), or a suitable spin torque oscillator (STO) configured to generate an axillary magnetic field to implement microwave assisted magnetic recording (MAMR).

In one embodiment, the EA element and/or the recording element of an EA head may have a limited operating life due to degradation over time, for example, due to thermal degradation. In one embodiment when the EA head nears the end of life, the corresponding disk surface is converted into a read-only disk surface meaning that previously written data may still be read from the disk surface, but no new data is written to the disk surface. As described in greater detail below, converting a disk surface to read-only may eventually reduce the overall capacity of the disk drive when data stored on a read-only disk surface becomes invalid due to an overwrite operation. Accordingly in one embodiment, in order to preserve the capacity of the disk drive the EA disk surface(s) are written in a sparingly manner, and in one embodiment used to store "cold data" that is infrequently written.

Figure 3:
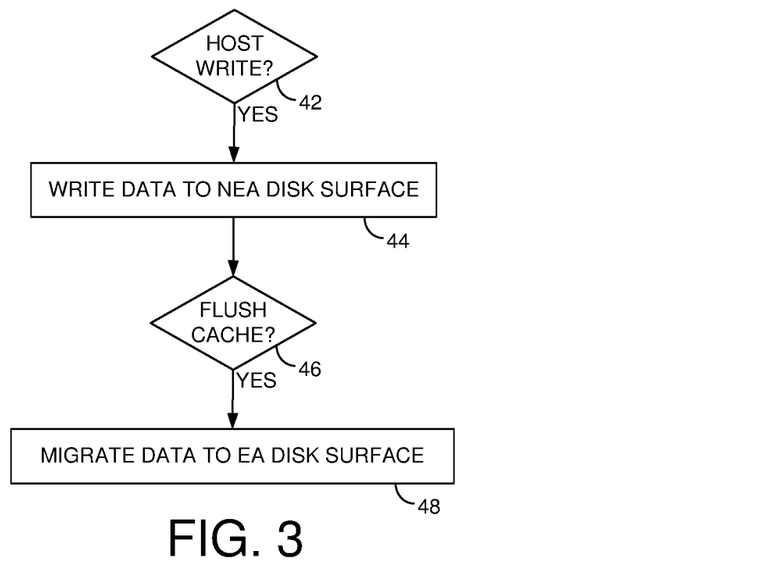
FIG. 3 is a flow diagram according to an embodiment wherein at least part of the NEA disk surface operates as a write cache that is flushed to the EA disk surface.

In one embodiment understood with reference to the flow diagram of FIG. 3, at least part of a NEA disk surface may be configured as a write cache wherein data associated with new write commands received from a host (block 42) are first written to the write cache of the NEA disk surface (block 44). Thereafter a decision to flush at least part of the write cache is made based on any suitable criteria, such as the amount of free space remaining in the write cache. When the decision to flush at least part of the write cache is made (block 46), at least part of the data is flushed from the write cache by migrating the data to one or more EA disk surfaces (block 48).

Figure 4:
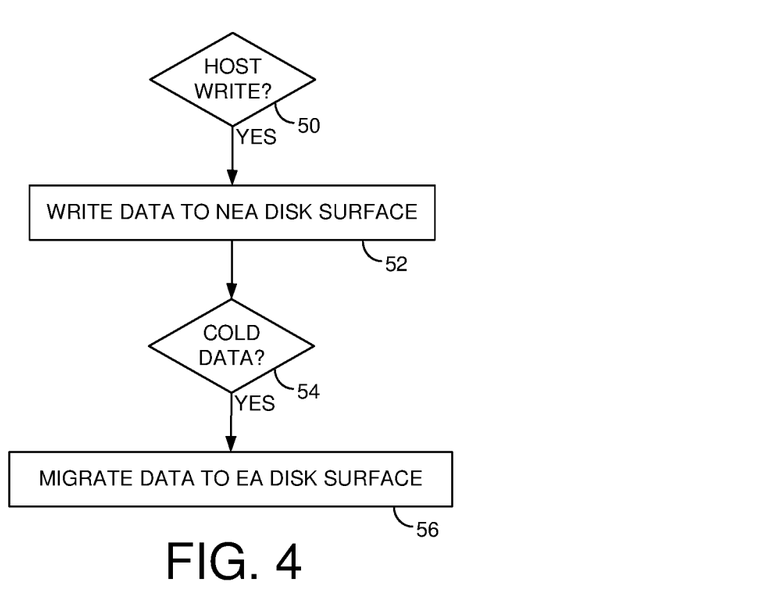
FIG. 4 is a flow diagram according to an embodiment wherein after writing data to the NEA disk surface, cold data is identified and then migrated to the EA disk surface.

In another embodiment understood with reference to the flow diagram of FIG. 4, when write commands are received from a host (block 50), the data associated with the write commands is first written to a NEA disk surface (block 52). The data written to a NEA disk surface is evaluated over time in order to identify cold data based on any suitable criteria. In one embodiment, cold data is identified by evaluating the write frequency of logical block addresses (LBAs) assigned to the data, wherein LBAs having a low write frequency may be considered as storing cold data, wherein when cold data is identified (block 54), the cold data is migrated to an EA disk surface (block 56). Migrating cold data to the EA disk surfaces effectively migrates the low frequency writes to the EA disk surfaces, thereby preserving the life of the EA heads.

In one embodiment, after migrating cold data to an EA disk surface and remapping the LBAs assigned to the cold data to the EA disk surface, one or more of the LBAs may be overwritten by a new write command. When this happens, in one embodiment the data of the new write command is written to an EA disk surface (e.g., to the same physical location or to a different physical location when implementing a log-structured write such as shingled magnetic recording (SMR)). That is when a low write frequency LBA assigned to an EA disk surface is overwritten, in one embodiment the data of the new write command is presumed to retain the "cold data" status. In an alternative embodiment when a low write frequency LBA assigned to an EA disk surface is overwritten, the data of the new write command is reclassified as "hot data" and therefore initially written to a NEA disk surface (e.g., to a write cache of a NEA disk surface) and the corresponding LBAs remapped to the NEA disk surface. Over time the LBAs may again be identified as storing cold data and therefore again migrated to an EA disk surface.

Figure 5A:
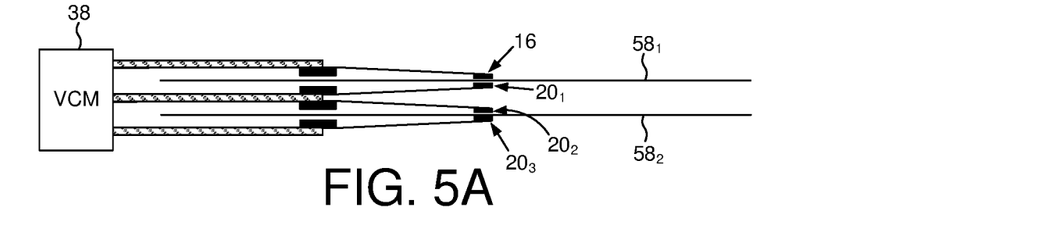
FIG. 5A shows an embodiment wherein the disk drive comprises multiple disks including at least one NEA disk surface and at least two EA disk surfaces.

FIG. 5A shows an embodiment wherein the data storage device may comprise multiple disks (e.g., disk $58_1$ and disk $58_2$) each having top and bottom disk surfaces. In the embodiment of FIG. 5A, a NEA head 16 is actuated over the top disk surface of disk $58_1$, and an EA head ($20_1$-$20_3$) is actuated over each of the remaining three disk surfaces. In other embodiments, there may be two or more NEA heads actuated over respective disk surfaces and one or more EA heads actuated over respective disk surfaces. In an embodiment wherein data (e.g., cold data) is migrated from a NEA disk surface to multiple EA disk surfaces, the data may be migrated in an interleaved manner to each EA disk surface in segments that ensure the EA heads do not overheat, thereby reducing the thermal stress of each EA head.

Figure 5B:
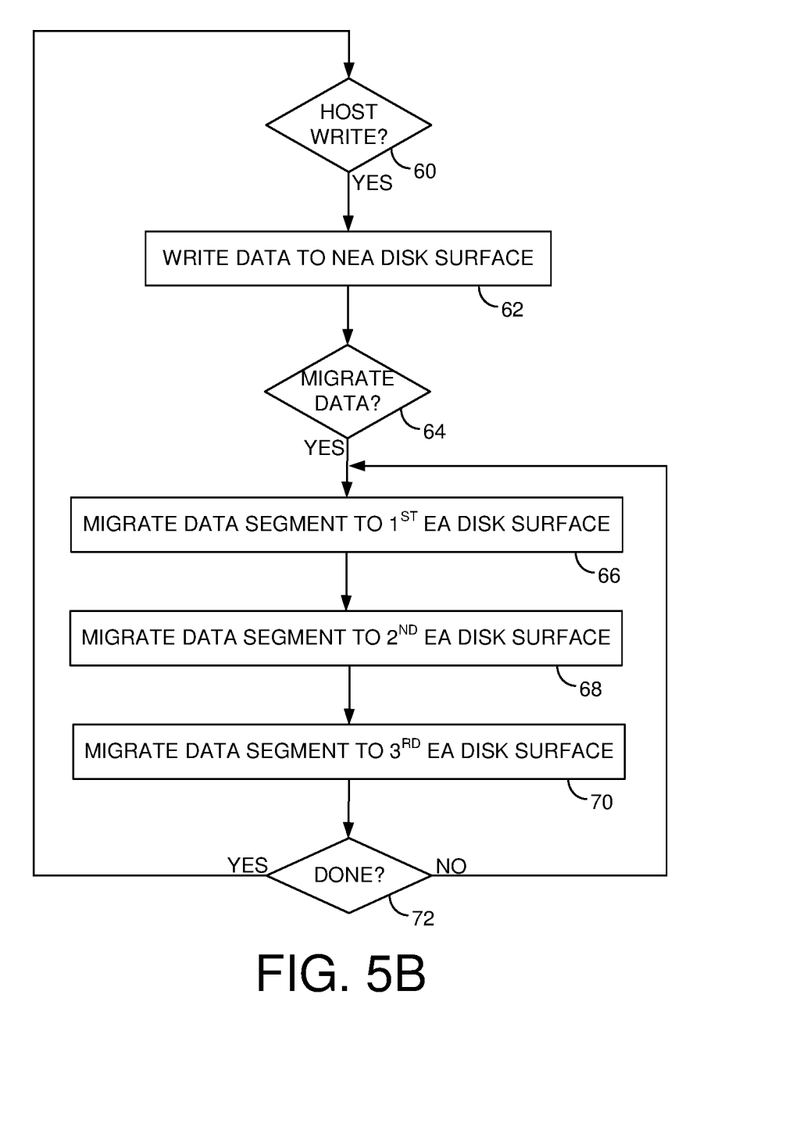
FIG. 5B is a flow diagram according to an embodiment wherein when migrating data from a NEA disk surface, the data is written to multiple EA disk surfaces in an interleaved manner to prevent the EA heads from overheating.

An example of this embodiment is understood with reference to the flow diagram of FIG. 5B wherein when a write command is received from a host (block $6_0$), the data associated with the write command is first written to a NEA disk surface (block 62). Eventually a decision is made (block 64) to migrate at least some of the data to multiple of the EA disk surfaces (three EA disk surfaces in this example), such as when the amount of cold data stored on the NEA disk surface exceeds a predetermined threshold. In this embodiment, the migration of the data is executed in segments, such as by writing a data segment to the first EA disk surface (block 66), then writing a data segment to the second EA disk surface (block 68), then writing a data segment to the third EA disk surface (block 70). This process of migrating data in segments in an interleaved manner to each EA disk surface is then repeated until the migration is completed or is interrupted at block 72, for example, by the need to execute a host access command. In this embodiment the interleave sequence for migrating the data to the EA disk surfaces is sequential and circular (i.e., 1, 2, 3, 1, 2, 3, . . . ), whereas in other embodiments the sequence may be sequential forward then sequential reverse (i.e., 1, 2, 3, 2, 1, 2, 3 . . . ). In yet another embodiment described below, the interleave sequence may be ordered based on the length of each data segment so as to balance the migration load of each EA disk surface. That is, in one embodiment the segment length for migrating data to each EA disk surface may be calibrated based on a measured quality of the corresponding EA head, and then the interleave sequence may be ordered to achieve a substantially balanced migration load across the EA disk surfaces.

Figure 6:
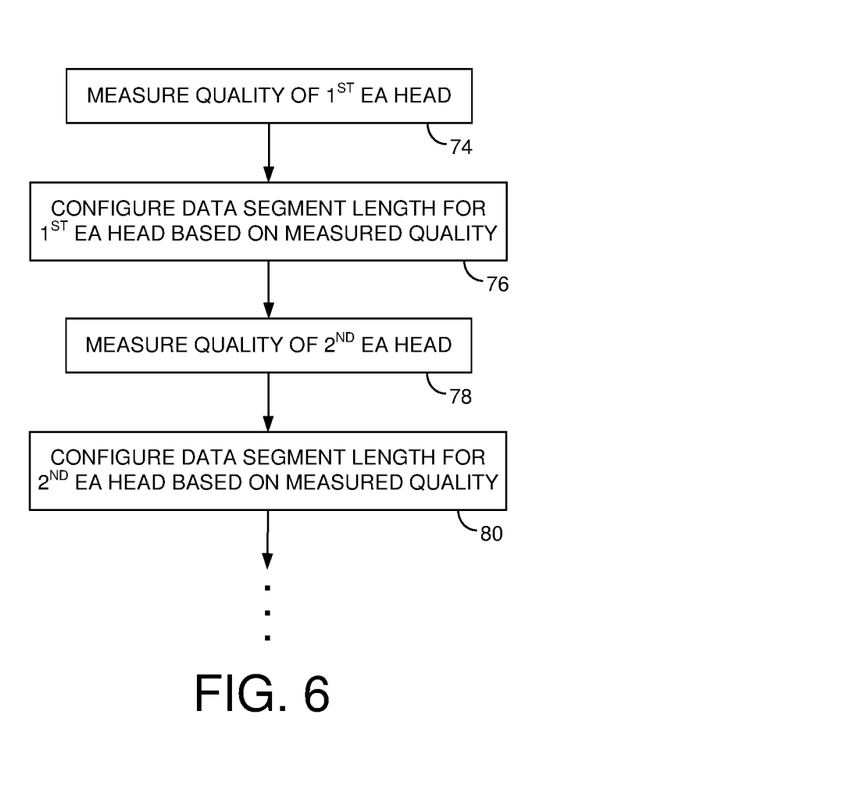
FIG. 6 is a flow diagram according to an embodiment wherein a quality of an EA head is measured in order to configure a segment length for migrating data that avoids overheating the EA head.

An example of this embodiment is understood with reference to FIG. 6 wherein a quality metric of a first EA head is measured (block 74), and the data segment length for migrating data to the corresponding disk surface is configured based on the measured quality metric (block 76). In one embodiment, the data segment length is selected to have a positive correlation with the quality of the EA head so that higher quality EA heads may perform a longer sequential write as compared to a lower quality EA head. That is, a higher quality EA head may tolerate a longer sequential write before there is significant stress due to overheating as compared to a lower quality EA head. In the embodiment of FIG. 6, the quality of each EA head is measured to configure a corresponding data segment length, such as measuring a quality metric of a second EA head (block 78) and configuring a corresponding data segment length for the second EA head (block 80).

Any suitable quality metric may be measured for an EA head, such as an overwrite capability which may be measured by writing a first frequency pattern to the EA disk surface, overwriting the first frequency pattern with a second frequency pattern, and then measuring the residual strength of the first frequency pattern during a read operation. In another embodiment, the quality metric of an EA head may be based on a calibrated operating power of the EA head, wherein a higher operating power may indicate a lower quality head. In yet another embodiment, the quality of an EA head (e.g., durability) may be based on the heating effect of a fly height actuator configured to adjust the fly height of the head to a nominal fly height during write operations. An EA head requiring a higher power applied to the fly height actuator (and therefore increased heating) may be considered a lower quality head.

In one embodiment, the quality of each EA head may be periodically measured and updated during the lifetime of the data storage device, and corresponding adjustments made to the data segment lengths of each EA head as the quality metric may change over time (or with changing environmental conditions such as ambient temperature). That is, in one embodiment the quality of each EA head (and heating tolerance) may change as one or more components of the head degrades over time and/or as the heating effect changes as environmental conditions change, for example, as the ambient temperature fluctuates. Accordingly, in one embodiment the data segment length may be varied over time to avoid the stress of overheating an EA head during a write operation.

Figure 7:
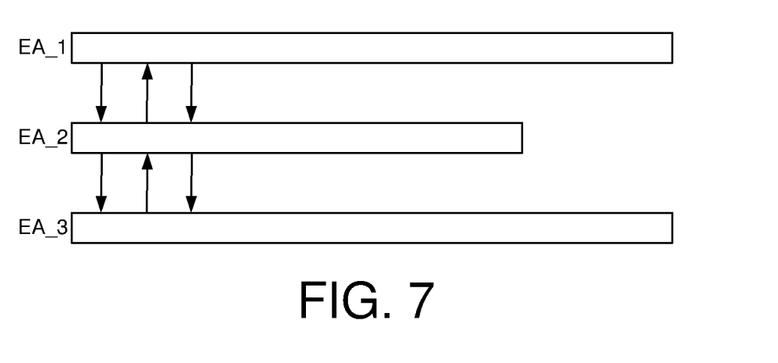
FIG. 7 shows an embodiment wherein when interleave migrating data to the EA disk surfaces the interleaving order is based on the calibrated data segment length of each EA disk surface.

FIG. 7 shows an embodiment wherein the data segment length calibrated for each of three EA heads are substantially the same for the first and third heads, but shorter for the second head. That is in this embodiment, the quality of the first and third EA heads is substantially the same, whereas the quality of the second EA head is relatively lower. In this embodiment, the interleave order for migrating data to the EA disk surfaces may be configured so as to substantially balance the load when migrating data from a NEA disk surface. In the example shown in FIG. 7, the interleave order is 1, 2, 3, 2, 1, 2, 3 . . .

resulting in data being more often migrated to the second EA disk surface but with smaller data segments, thereby helping to balance the migration load across all three EA disk surfaces. In one embodiment, the migration load of each EA disk surface may be tracked over time and the interleave order adjusted accordingly in order to maintain a substantially balanced migration load across the EA disk surfaces. That is, in one embodiment the interleave order when migrating data may not be a repeating sequence but instead a varying sequence that helps ensure a balanced load.

In one embodiment when migrating data to multiple EA disk surfaces, balancing the migration load across the EA disk surfaces as described above helps reduce the access latency when reading the written data. For example, when migrating a large video file from a NEA disk surface to multiple EA disk surfaces, maintaining a substantially balanced migration load helps ensure the cylinders of the interleaved data segments are relatively close to one another, thereby reducing the seek latency associated with accessing the data tracks of each EA disk surface during a read operation.

In one embodiment, data may be migrated to two or more EA disk surfaces by concurrently writing data to two or more disk surfaces, such as by concurrently writing to top and bottom surfaces of an EA disk. In one embodiment, the data may be concurrently written in limited length data segments, wherein concurrently writing to different sets of disk surfaces may be interleaved similar to interleaving the single write operations as described above in order to avoid overheating the EA heads. When the calibrated data segment lengths for a set of concurrently written EA heads are of different lengths, in one embodiment the data segment length for each EA head in the set is configured to be the shortest calibrated length out of all the EA heads in the set.

In one embodiment, data may be written to at least the EA disk surfaces using a log structured write system wherein new data is written to the head of a circular buffer, and previously written data may become invalid when LBAs are overwritten. Shingled magnetic recording (SMR) is an example of a log structured write system wherein data is written as sequentially, overlapping data tracks (i.e., a previously written data track is partially overwritten by a currently written data track). In one embodiment, the calibrated data segment lengths as described above may be used during a garbage collection operation of the EA disk surfaces when valid segments of the circular buffer may be rewritten to the head of the circular buffer so as to reclaim the storage area of the invalid data segments. In one embodiment, at least part of a NEA disk surface may operate as a non-volatile memory that facilitates a garbage collection operation so as to preserve the state of the operation through a power failure event.

In one embodiment when degradation of the energy assist element of an EA head reaches a critical level, the corresponding EA disk surface may be converted to a read-only disk surface (i.e., write operations to the disk surface may be disabled). Before converting an EA disk surface to read-only, in one embodiment the coldest data across the other disk surfaces may be migrated to the failing EA disk surface and relatively hotter data may be migrated away from the failing EA disk surface. In this manner when the failing EA disk surface is converted to read-only, the cold data will remain valid and readable even though write operations will have been disabled.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first disk surface;
   a non-energy assist (NEA) head configured to access the first disk surface;
   a second disk surface;
   a first energy assist (EA) head configured to access the second disk surface; and
   control circuitry configured to:
      write data to the first disk surface;
      migrate at least part of the data to the second disk surface by writing the data to the second disk surface in segments; and
      configure a length of each segment to control an operating temperature of the first EA head.

2. The data storage device as recited in claim 1, wherein at least part of the first disk surface operates as a write cache for write commands received from a host.

3. The data storage device as recited in claim 2, wherein at least part of the data is migrated to the second disk surface by flushing at least part of the write cache.

4. The data storage device as recited in claim 1, wherein the control circuitry is further configured to:
   identify cold data out of the data written to the first disk surface; and
   migrate the identified cold data to the second disk surface.

5. The data storage device as recited in claim 1, further comprising a third disk surface and a second EA head configured to access the third disk surface, wherein the control circuitry is further configured to migrate at least part of the data from the first disk surface to the second and third disk surfaces by:
   first writing a first segment of the data to the second disk surface; and
   second writing a second segment of the data to the third disk surface.

6. The data storage device as recited in claim 5, wherein the control circuitry is further configured to:
   configure a length of the first segment to control an operating temperature of the first EA head; and
   configure a length of the second segment to control an operating temperature of the second EA head.

7. The data storage device as recited in claim 6, wherein control circuitry is further configured to:
   measure a quality of the first EA head;
   measure a quality of the second EA head;
   configure the length of the first segment based on the measured quality of the first EA head; and
   configure the length of the second segment based on the measured quality of the second EA head.

8. The data storage device as recited in claim 5, wherein the control circuitry is further configured to migrate at least part of the data from the first disk surface to the second and third disk surfaces by:
   third writing a third segment of the data to the second disk surface; and
   fourth writing a fourth segment of the data to the third disk surface.

9. The data storage device as recited in claim 8, wherein the first, second, third and fourth writings are interleaved.

10. The data storage device as recited in claim 5, wherein at least part of the first writing is concurrent with at least part of the second writing.

11. A data storage device comprising:
    a first disk surface;
    a non-energy assist (NEA) head configured to access the first disk surface;
    a second disk surface;
    a first energy assist (EA) head configured to access the second disk surface;
    a third disk surface;
    a second energy assist (EA) head configured to access the third disk surface; and
    control circuitry configured to write data to the first disk surface and migrate at least part of the data from the first disk surface to the second and third disk surfaces by at least:
       first writing a first segment of the data to the second disk surface; and
       second writing a second segment of the data to the third disk surface.

12. The data storage device as recited in claim 11, wherein the control circuitry is further configured to:
    configure a length of the first segment to control an operating temperature of the first EA head; and
    configure a length of the second segment to control an operating temperature of the second EA head.

13. The data storage device as recited in claim 12, wherein control circuitry is further configured to:
    measure a quality of the first EA head;
    measure a quality of the second EA head;
    configure the length of the first segment based on the measured quality of the first EA head; and configure the length of the second segment based on the measured quality of the second EA head.

14. The data storage device as recited in claim 11, wherein the control circuitry is further configured to migrate at least part of the data from the first disk surface to the second and third disk surfaces by:

third writing a third segment of the data to the second disk surface; and fourth writing a fourth segment of the data to the third disk surface.

15. The data storage device as recited in claim 14, wherein the first, second, third and fourth writings are interleaved.

16. The data storage device as recited in claim 11, wherein at least part of the first writing is concurrent with at least part of the second writing.

17. The data storage device as recited in claim 11, wherein at least part of the first disk surface operates as a write cache for write commands received from a host.

18. The data storage device as recited in claim 17, wherein at least part of the data is migrated to the second and third disk surfaces by flushing at least part of the write cache.

19. The data storage device as recited in claim 11, wherein the control circuitry is further configured to:

identify cold data out of the data written to the first disk surface; and migrate the identified cold data to the first and second disk surfaces.

20. A data storage device comprising:

a first disk surface;

a non-energy assist (NEA) head configured to access the first disk surface;

a second disk surface;

a first energy assist (EA) head configured to access the second disk surface;

a means for writing data to the first disk surface;

a means for migrating at least part of the data to the second disk surface by writing the data to the second disk surface in segments; and a means for configuring a length of each segment to control an operating temperature of the first EA head.

21. A data storage device comprising:

a first disk surface;

a non-energy assist (NEA) head configured to access the first disk surface;

a second disk surface;

a first energy assist (EA) head configured to access the second disk surface;

a third disk surface and a second EA head configured to access the third disk surface; and control circuitry configured to:

write data to the first disk surface; and migrate at least part of the data from the first disk surface to the second and third disk surfaces by:

first writing a first segment of the data to the second disk surface; and second writing a second segment of the data to the third disk surface.

\* \* \* \* \*